United States Patent [19]

Nagamitsu et al.

[11] Patent Number: 5,467,401
[45] Date of Patent: Nov. 14, 1995

[54] SOUND ENVIRONMENT SIMULATOR USING A COMPUTER SIMULATION AND A METHOD OF ANALYZING A SOUND SPACE

[75] Inventors: Sachio Nagamitsu, Kyoto; Mayumi Sakai, Hirakata; Hisashi Kodama, Ikoma; Tsuneko Okada, Moriguchi, all of Japan

[73] Assignee: Matsushita Electric Industrial Co., Ltd., Osaka, Japan

[21] Appl. No.: 135,008

[22] Filed: Oct. 12, 1993

[30] Foreign Application Priority Data

Oct. 13, 1992 [JP] Japan .................................. 4-274248
Jan. 14, 1993 [JP] Japan .................................. 5-004836
Sep. 6, 1993 [JP] Japan .................................. 5-221101

[51] Int. Cl.$^6$ .................................................. H03G 3/00
[52] U.S. Cl. .............................................. 381/63; 381/17
[58] Field of Search ......................................... 381/17, 63

[56] References Cited

U.S. PATENT DOCUMENTS

| | | | |
|---|---|---|---|
| 4,731,848 | 3/1988 | Kendall et al. | 381/63 |
| 4,928,250 | 5/1990 | Greenberg et al. | 364/518 |
| 5,046,097 | 9/1991 | Lowe et al. | 381/17 |
| 5,142,586 | 8/1992 | Berkhout | 381/63 |
| 5,173,944 | 12/1992 | Begault | 381/17 |

FOREIGN PATENT DOCUMENTS

| | | |
|---|---|---|
| 0432973 | 12/1990 | European Pat. Off. . |
| 11041321 | 9/1989 | Japan . |
| 30038695 | 5/1991 | Japan . |

*Primary Examiner*—Stephen Brinich
*Attorney, Agent, or Firm*—Price Gess & Ubell

[57] ABSTRACT

The present invention discloses a sound environment simulator including a sound field analyzing unit, a sound field reproducing unit, and an output unit. The sound environment analyzing unit divides the solid surfaces of a space to be analyzed into a set of sections to compute the volume of reflected sounds with a sound absorption coefficient of walls and form factors. It further computes time series data related to the arrival volume of sounds emanated from a certain sound source to the sound receiving point. An impulse response computing unit in the sound field reproducing unit transduces the time series data into an impulse response. Accordingly, the sound field reproducing unit convolutes the impulse response on a dry source in accordance with data related to a listener's position inputted from an associated virtual reality equipment to generate a reproduced sound over a headphone.

19 Claims, 14 Drawing Sheets

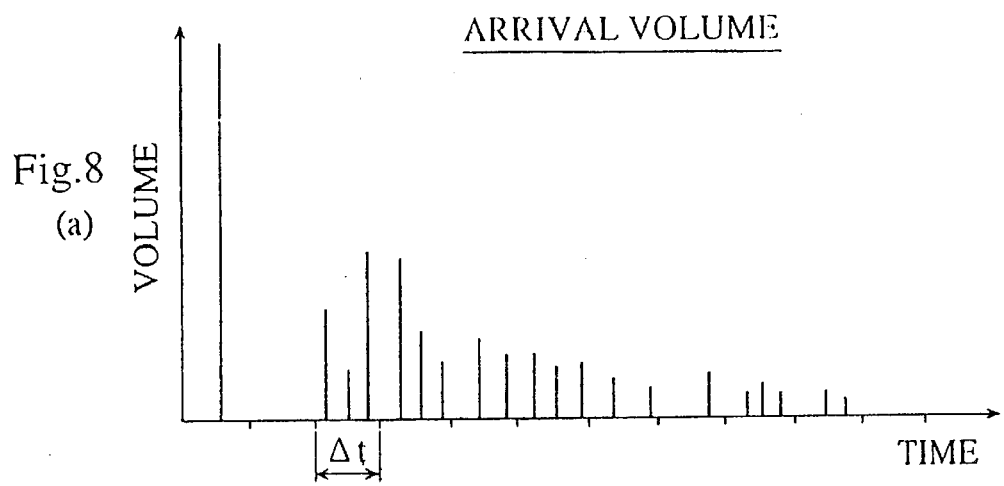
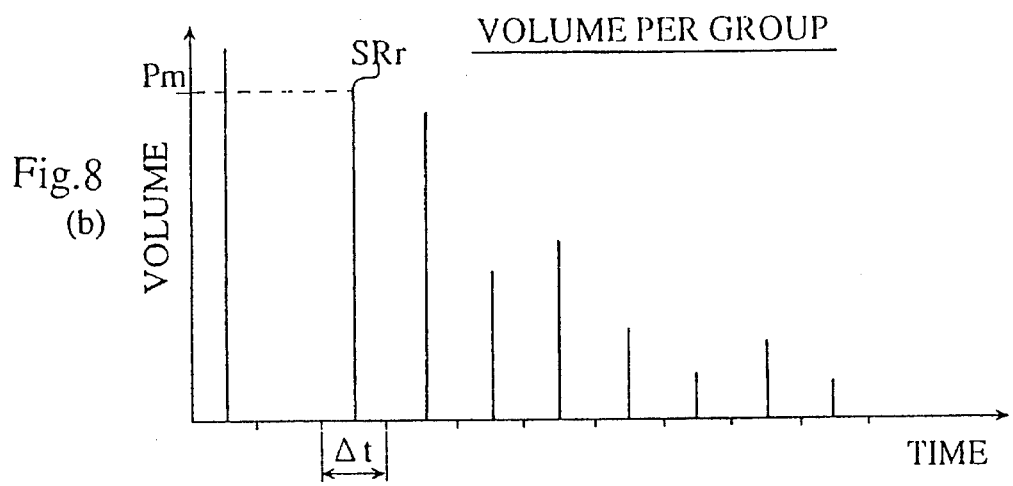
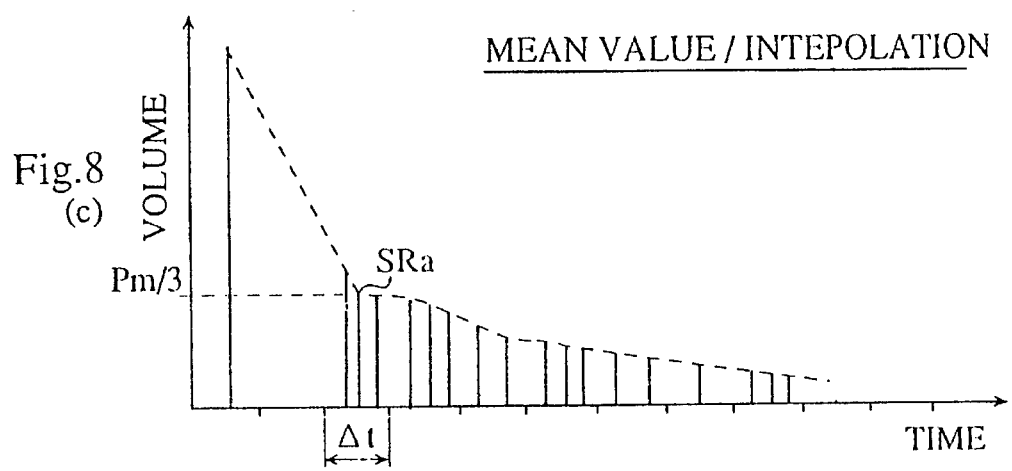

SOUND ENVIRONMENT SIMULATOR USING A COMPUTER SIMULATION AND A METHOD OF ANALYZING A SOUND SPACE

BACKGROUND OF THE INVENTION (1) Field of the Invention

The present invention relates to a sound environment simulator which enables one to experience a computer simulation of sound performance when modeling acoustic affects in a listening room, a concert hall or the like, and to a method of analyzing spatial acoustic characteristics of a sound space.

(2) Description of the Related Art

Rapid advancement in the field of audio-visual technology makes it possible to supply high-quality music and images to individual homes. In particular, what has been attracting people's interest is a technique, a so-called "home theater", by which one can enjoy a movie or music at home as if he were in a movie theater or a concert hall. To enjoy the home theater, it is desirable to have a room where acoustic affects and sound insulation effects are well taken into account. However, in most of the cases, people enjoy movies and music in their living rooms where a variety of furniture and household appliances are installed. Thus, nowadays, not only the appearance and the feeling of being comfortable, but also the acoustic affects and insulation effects are important elements when designing for living rooms.

Conventionally, data related to acoustic characteristics are evaluated for modeling acoustic affects: they are computed by either experimental or analytical method and then fed back to design specifications.

In the experimental method, a model room is constructed, and an impulse response is measured directly to compute the acoustic characteristics data of the model room. However, the costs both for building materials and labor do not allow its application to individual house construction.

Whereas in the analytical method, the acoustic characteristics data are computed by a computer as it simulates a three dimensional sound field. This method has been widely used in recent years. Because the resulting data reliably correspond to various input conditions, become a reliable source for further analysis, and facilitate further processing and feedback to the design specifications.

Data necessary for simulating the three dimensional sound field are computed either by a numerical analysis or a geometric analysis based on theory of acoustics: sound waves are taken into account in the former, whereas they are not in the latter.

A finite element method(FEM) and a boundary element method(BEM) are typically used in the numerical analysis. In both the methods, the computer computes acoustic intrinsic modes or pressure distribution of a sound by solving a dominance equation of a stationary sound field, or namely Helmholtz's equation. Taking the sound waves into account makes it possible to analyze diffraction and interference of the sound; however, it does not allow the computation of a non-stationary value such as an echotime pattern. In particular, to compute the echotime pattern of a high frequency sound, a myriad number of lattices are involved, so that not only it takes a relatively long time period, but also the amount thereof exceeds a conventional memory capacity. For this reason, the numerical analysis has not been applied to practical applications.

On the other hand, in the geometric analysis based on the theory of acoustics, methods using sound rays or virtual images are typically used on the premise that the sound rays are reflected geometrically from walls. These methods are practical; for the memory capacity does not limit the amount of the computation. However, this analysis does not guarantee accuracy in all cases. For example, the resulting data may not be accurate when simulating the sound field with a low frequency sound in a room where a wave length is longer than its size. Because given these circumstances, the sound rays fail to reflect in accordance with the premise.

In addition, a reverberation time, which is a critical element to compute the acoustic characteristics data, is approximated by Sabine's or Eyring's equation to minimize the amount of computation for the sound ray tracing. Such an approximation causes an computation error when this analysis is applied to a space where a variety of household appliances are to be installed or whose shape is complex.

Another type of sound environment simulator has been developed in recent years. This type of simulator simulates a sound field by reproducing a sound in accordance with the acoustic characteristics data, so that one can hear the reproduced sound. In a broad sense, the sound environment simulator includes a model room where one can listen to a sound reproduced over speakers installed therein. However, this type of simulator is not applicable for individual house construction.

Accordingly, a sound environment simulator, disclosed in U.S. Pat. No. 4,731,848, was proposed. This simulator is designed to reproduce a sound over a headphone with reverberation effects. More precisely, an input audio signal is branched and the branched signal is inputted into a delay circuit. Then, the delay circuit delays the output of the branched signal for latency comparable to the time difference of the reflected sound to produce a reverberant signal. Subsequently, the original input audio signal and reverberant signal are composited to generate an output signal which is transduced into a sound. However, the sound reproduced in this way may give an impression to a listener that it does not sound realistic; for the sounds of higher order reflections (i.e. the sounds reflected for a number of times) are discarded.

Moreover, this type of simulator does not reproduce the sound immediately. This is because index data such as locations of a virtual sound source and the listener are inputted manually each time they move. Furthermore, the shape of a space selected as a model environment is limited.

SUMMARY OF THE INVENTION

Accordingly, the present invention has an object to provide a sound environment simulator which enables a listener to experience a simulation of sound environment of a space selected as a model environment without constructing the model space.

The present invention has another object to provide a sound environment simulator which can reproduce a sound in accordance with changes in acoustic characteristics associated with dynamic changes such as a listener's position or direction of his head.

The above objects are fulfilled by a sound environment simulator which comprises an echotime pattern computing unit, an impulse response computing unit, a sound reproducing unit, and an output unit. The echotime pattern computing unit computes an echotime pattern for a specific space to be analyzed by a geometric analysis based on the theory of acoustics with data related to conditions of the specific space. The impulse response computing unit computes a response for each frequency band from the echotime pattern, and composites all the responses together to generate an impulse response. The sound reproducing unit convolutes the impulse response on non-reverberant sound source data to generate reproduced sound data which are further outputted as a sound from the output unit.

According to the above construction, the sound environment simulator can analyze the acoustics across a broad range of frequencies, thereby enabling the reproduction of a sound field at any desired location within a space of any shape.

The sound environment simulator may include a location data detecting unit for detecting at least one of the location of a listener's head or its direction. The sound reproducing unit may extract the impulse response and a head transfer function corresponding to the detected location data, and convolute them on the non-reverberant sound source data to generate the reproduced sound data. The head transfer function is a parameter stored in a memory in advance that represents the change in an incident sound in accordance with the shape of the head and a location of ears.

According to the above construction, the sound environment simulator can produce a sound field adequately corresponding to changes in the sound associated with dynamic changes such as the change of the listener's position or his head direction. The sound field thus reproduced gives the listener an impression as if he were in the specific space.

Further, the present invention has another object to provide a method of analyzing a sound space for computing spatial acoustic characteristics data together with the effects of the sounds of higher order reflections.

The above object is fulfilled by a method of analyzing a sound space comprising the steps of setting analysis conditions including the shape of the specific space and physical data of surfaces, a set of certain sections by dividing the surfaces, a virtual sound source and a virtual sound receiving point, computing time series data of arrival volume of the sound emanated from the sound source to the sound receiving point for each incident direction and frequency band, and computing an echotime pattern by interpolating certain data to the time series data of the arrival volume.

The method may further comprise the steps of computing an echotime pattern for each frequency band using a geometric analysis based on the theory of acoustics at the sound receiving point, convoluting the echotime patterns by a bandpass filter for each frequency band to compute a response for each frequency band to composite all the responses together to form an impulse response, detecting location data of a listener, receiving a dry source(the sound recorded in an anechoic room) of the sound source, producing a reproduced sound data by convoluting the impulse response and a head transfer function corresponding to the detected location data on the dry source, and transducing the reproduced sound data into a sound.

The above method makes it possible to compute the data related to the sound of the higher order reflections, which further enables a precise prediction of a reverberation time from the time series data of the arrival volume. Moreover, the impulse response data corresponding to any location of the listener and direction of his head can be analytically computed. As a result, a realistic sound field can be reproduced by means of a virtual reality (VR) equipment.

BRIEF DESCRIPTION OF THE DRAWINGS

These and other objects, advantages and features of the invention will become apparent from the following description thereof taken in conjugation with the accompanying drawings which illustrate specific embodiments of the invention. In the drawings:

FIG. 7(*b*) is another graph of the time series data of the arrival volume divided into a set of groups at one of the divided section;

FIG. 8(*a*) is a graph of the time series data of the actual arrival volume at the sound receiving point;

FIG. 8(*b*) is a graph of the time series data of the arrival volume divided into a set of groups at the sound receiving point;

FIG. 8(*c*) is a graph of the time series data of the arrival volume interpolated with a certain data(echotime patter) at the sound receiving point;

DESCRIPTION OF THE PREFERRED EMBODIMENTS

[First Embodiment]

A sound environment simulator in accordance with the first embodiment reproduces a realistic, stereophonic sound by computing data related to acoustic characteristics in a virtual space created as a model environment, so that a listener can experience a simulation of a sound field.

Figure 1:
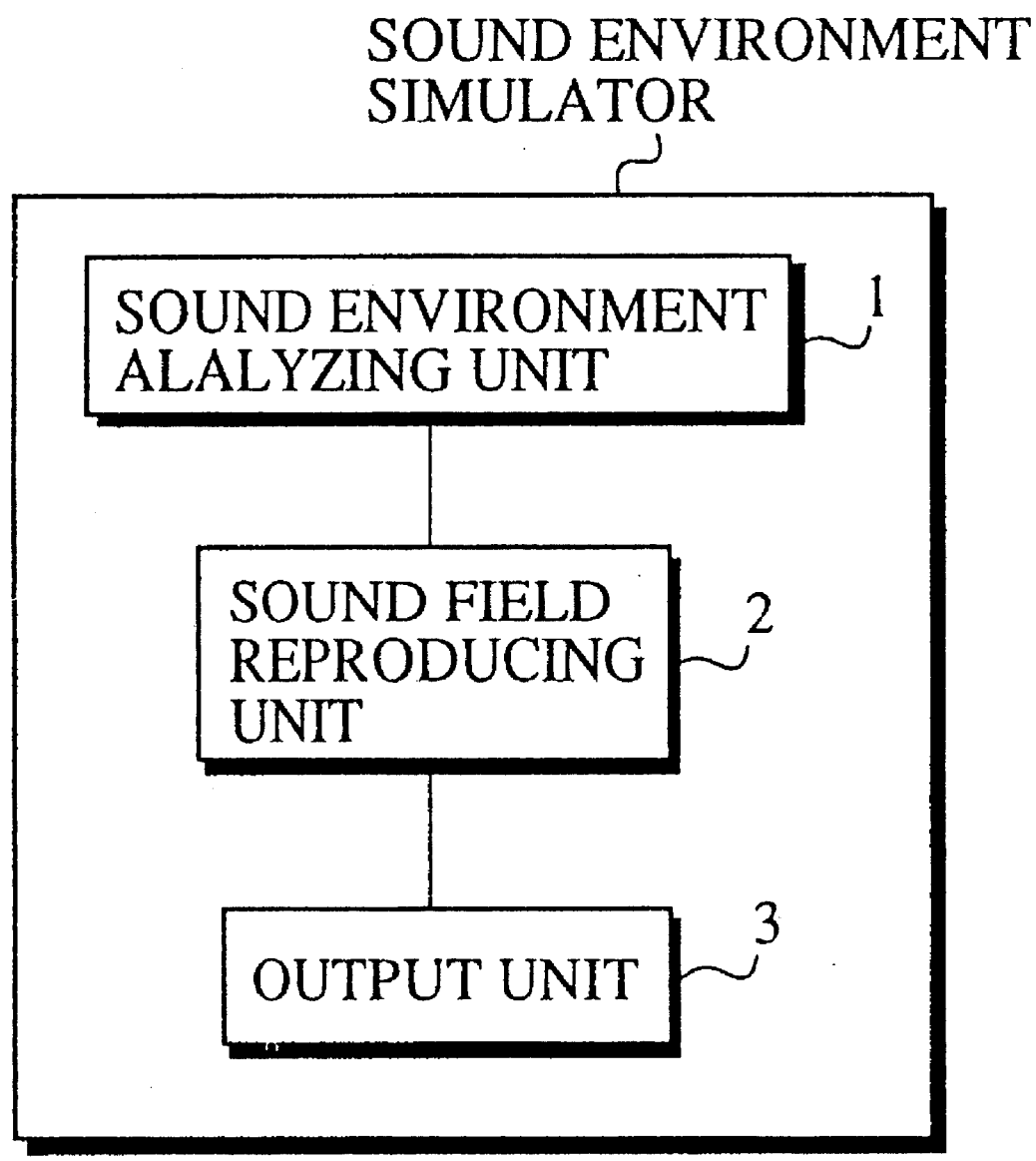
FIG. 1 is a block diagram of the sound environment simulator of the present invention.

The sound environment simulator, as is shown in FIG. 1, comprises a sound environment analyzing unit 1, a sound field reproducing unit 2, and an output unit 3. The sound environment analyzing unit 1 analyzes the acoustic characteristics in the virtual space by means of computer simulation to compute a echotime pattern. The sound field reproducing unit 2 computes data related to an impulse response from the echotime pattern to transduce non-reverberant portion of a desired sound into a consecutive sound signal on real time. The output unit 3 includes a headphone or the VR equipment and transduces the consecutive sound signal into a sound.

The above-described sound environment simulator is designed to simulate changes in the sound occurring as the listener stands up, sits down, walks around in a room, or moves his head. More precisely, the sound environment analyzing unit 1 computes the echotime patterns for each location, incident direction, and frequency of a sound source. The sound field reproducing unit 2 computes the impulse response from the echotime patterns, and adds further processing to produce a stereophonic sound signal, which is transduced into a sound by the output unit 3.

Figure 2:
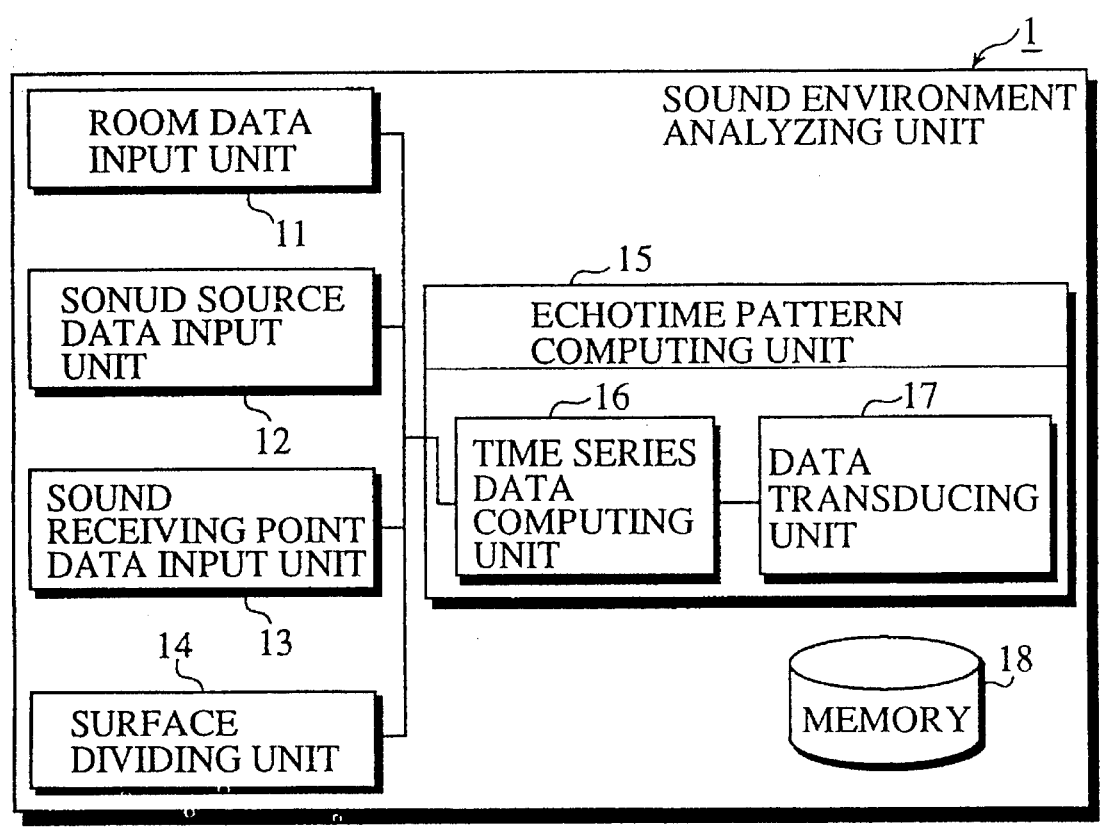
FIG. 2 is a block diagram of the sound environment simulator in accordance with the first embodiment.

FIG. 2 provides a detailed construction of the sound environment analyzing unit 1. It comprises a room data input unit 11, a sound source data input unit 12, a sound receiving point data input unit 13, a surface dividing unit 14, an echotime pattern computing unit 15 including a time series data computing unit 16 and a data transducing unit 17, and a memory 18.

The sound environment analyzing unit 1 computes the echotime patterns for each location in the virtual space, each incident direction of the sounds incident to the sound receiving point, and each sound source including a plurality of predetermined frequency bands.

Figure 3:
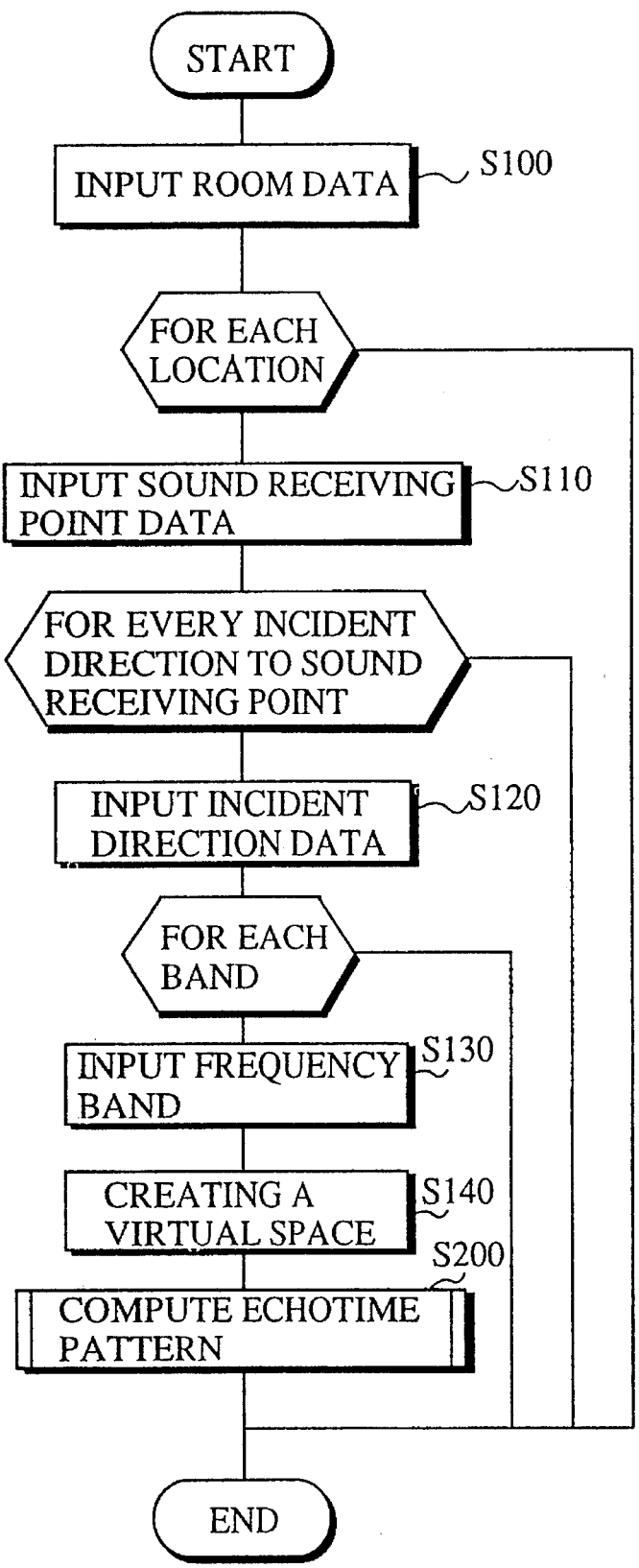
FIG. 3 is a flowchart detailing the operation of the sound environment analyzing unit 1.

The flowchart in FIG. 3 details the above-described operation.

In Step 100, data related to the virtual space such as the shape, size and a sound absorption coefficient of walls are inputted into the room data input unit 11. Subsequently, data related to the location of the sound receiving point(location of the listener's head), and data related to incident direction of the sound to the sound receiving point are inputted at the sound receiving point data input unit 13 in Steps 110 and 120, respectively. Further, data related to the sound source such as the frequency and volume thereof are inputted at the sound source data input unit 12 in Step 130.

Then, in Step 140, the surface dividing unit 14 divides solid surfaces, or namely the walls, of the virtual space into a set of sections, and numbers them serially. Each section is a rectangle whose side is shorter than the wave length of the sounds emanated from the sound source. It also sets the sound absorption coefficient for each section from the sound absorption coefficient inputted in Step 100, and the sound receiving point. The sound receiving point takes a form of, for example, a dodecahedron to approximate the listener's head.

Figure 5:
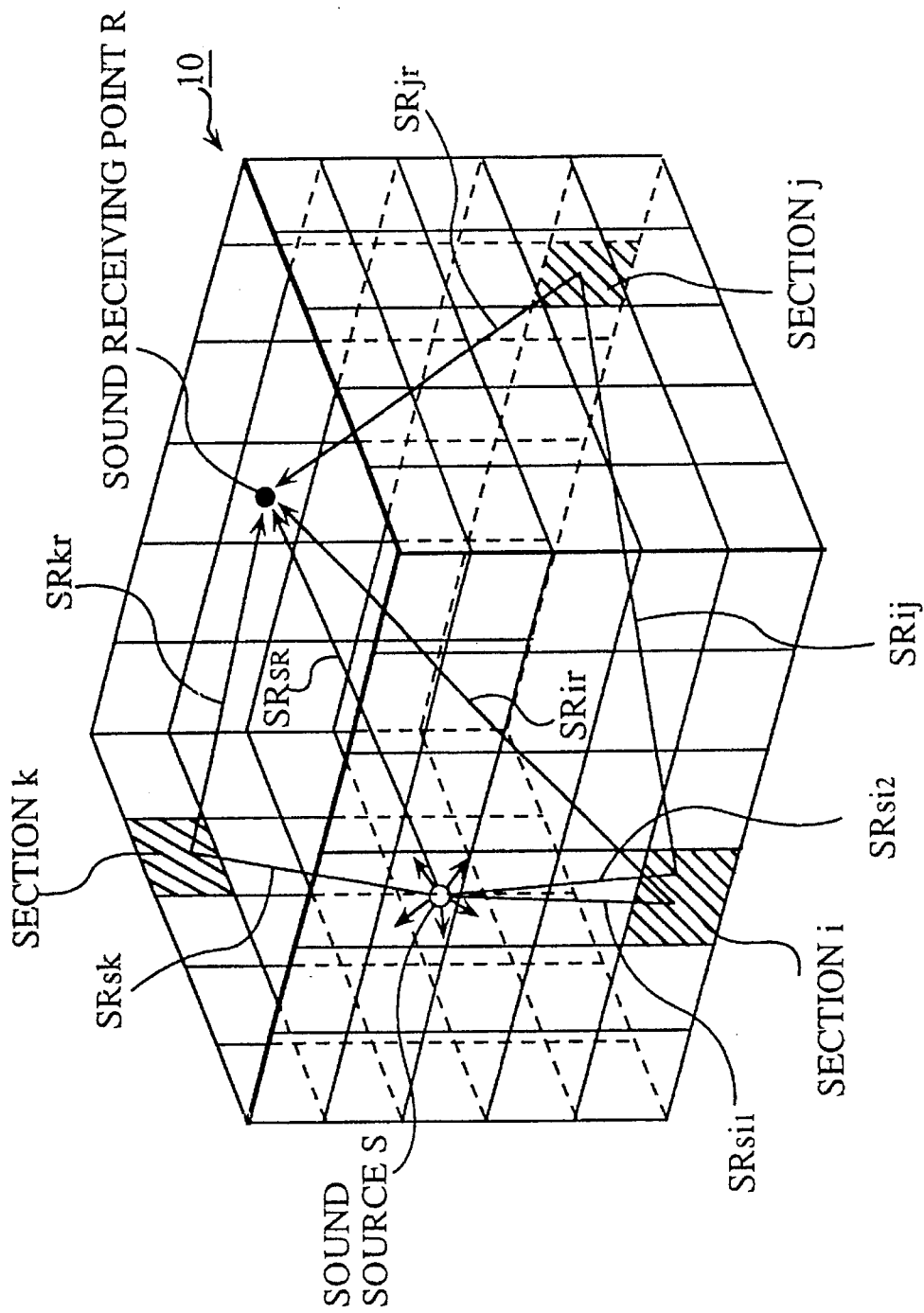
FIG. 5 is an illustration depicting the model space used by the echotime pattern computing unit 15.

An example of the virtual space created in this way is illustrated as a model space 10 in FIG. 5. In the drawing, one wall is divided into approximately 400 sections, and the sound source is set at 500 Hz, whereby the short side of each section is set to 45 cm. The sound absorption coefficient $\alpha$ is added to each section; the sound absorption coefficient $\alpha i$ is added to the section i, and $\alpha j$ to the section j. The frequency of the sound source is set per ⅛ octave band; for the sound absorption coefficient data of the walls are practically computed per octave band.

Figure 4:
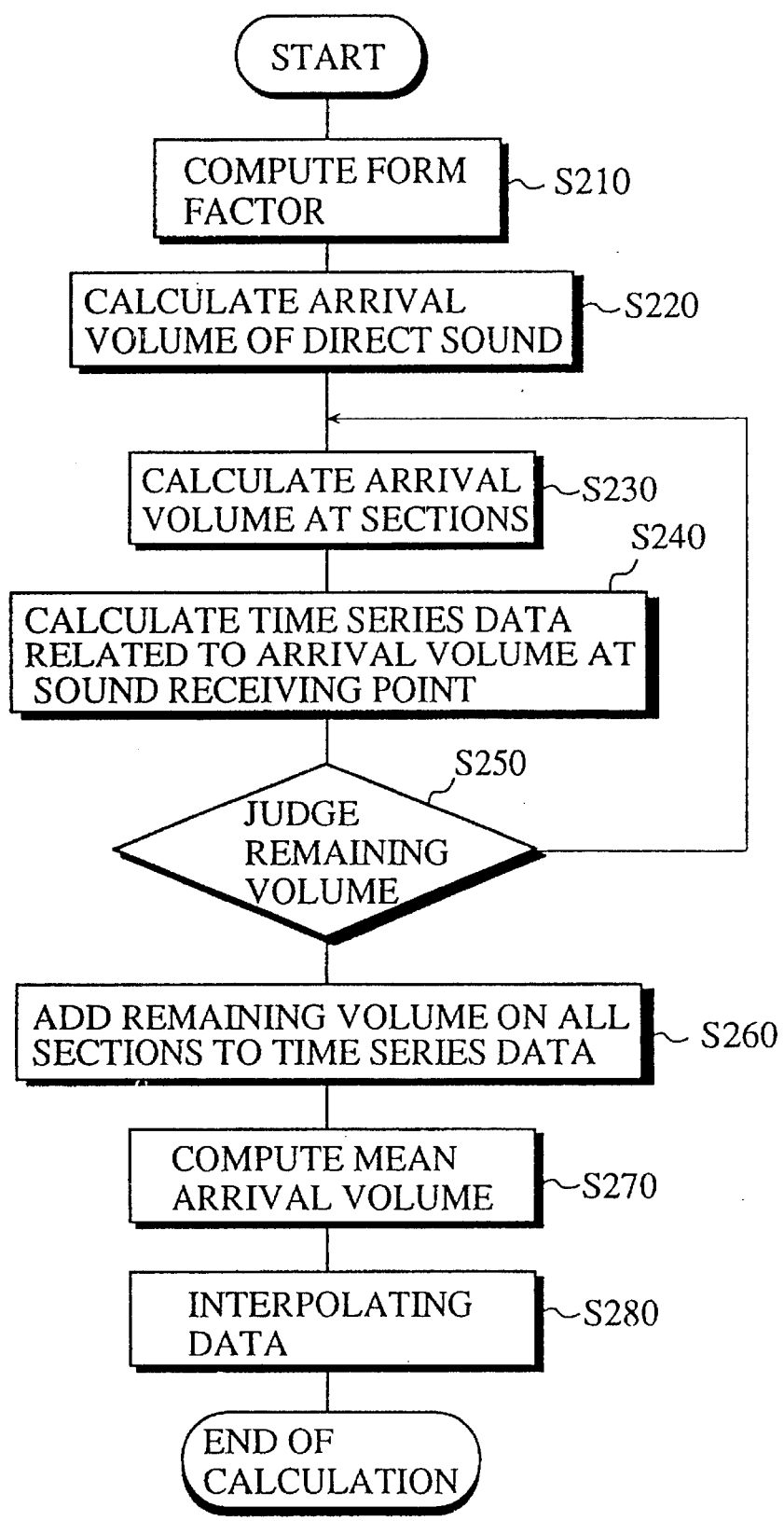
FIG. 4 is a flowchart detailing the sub-routine of the step for computing the echotime pattern in FIG. 3.

Once the model space 10 is created, the echotime pattern calculator 15 computes the echotime pattern in Step 200, which is detailed by the flowchart in FIG. 4.

In Step 210, the time series data computing unit 16 computes form factors. These form factors are calculated by a radiant heat ray tracing technique, which is often used in analyzing radiation in the thermal environment or lighting. Japanese laid-open patent application No. H5-52383, Hattori et al teaches the calculation method in detail. In this step, the form factors are calculated according to this calculation method with respect to the relations between: the sound source and each section; one section and another section; and each section and the sound receiving point, which are respectively referred to as Fsc, Fcc and Fcr.

The calculation of reflected sound with the form factors further adds reflection components having directivity and those of mirror reflection besides perfect reflection components to form factors as is with the lighting. Thus, more realistic reflections can be simulated by using this calculation. Also, this calculation is virtually a must when only an initial reflection by the mirror reflection at a relatively large divided section of a huge space such as a concert hall is roughly estimated, or when the reflection has the directivity due to the inclined walls.

More precisely, each form factor is calculated in the following way:

Form Factor Fsc (Sound Source→Section)  1)

Suppose an arbitrary positioned virtual sound source S evenly emanates a plurality of sound rays(e.g. 100,000 rays) in all directions. Then, specific sections at which each sound ray arrives are detected. For example, with the model space 10 in FIG. 5, a sound ray SRsk arrives at a section k, and sound rays $SRsi_1$ and $SRsi_2$ arrive at a section i. Accordingly, the time series data computing unit 16 computes the arrival volume P1 at each section to compute P1: Ps, P1's ratio to the volume of the sound source Ps, which is referred to as the form factor Fsc. In this way, the form factors Fsc's for all the sections are calculated.

Form Factor Fcc (Section→Section)  2)

For factor Fcc is calculated in the same manner. In this case, the arrival volume to one of the sections is considered to be a new sound source.

Form Factor Fcr (Section→Sound Receiving Point)  3)

Form factor Fcr is calculated in the same manner.

Once these form factors are calculated, the time series data computing unit 16 computes time series data related to the arrival volume. Note that the sound receiving point R receives two types of sounds: one is a direct sound from the sound source, and the other is a reflected sound from one of the sections. Thus, the time series data computing unit 16 computes the time series data of the direct sound first, thence, those of the reflected sound. For example, with the model space 10, the sound emanated along with the sound ray SRsr is the direct sound, and the one with the sound ray SRsk is the indirect sound.

Back to the flowchart, the time series data computing unit 16 computes the arrival volume of the direct sound in Step 220. The arrival volume denoted as Pr is computed with the distance from the sound source to the sound receiving point R according to the inverse square law, while at the same time, the arrival time denoted as TR is computed by dividing the distance by the speed of sound.

Next in the Step 230, the time series data computing unit 16 computes the arrival volume of the reflected sound. The amount of this computation increases a geometric series-fold, because the number of reflected sound rays are multiplied by the number of the sections each time they reflect. Thus, a memory must have quite a large capacity to store these myriad computation results. To avoid this problem, the volume of the reflected sound is computed in two ways depending on the number of reflections, or largeness of the orders. In this embodiment, the reflections up to the third order are referred to as lower order reflections, and the reflections beyond the third order reflections as higher order reflections.

To begin with, a method for computing the arrival volume of the sound of the lower order refections to the sound receiving point R will be explained with referring to FIG. 5.
(The First Order Reflections)

Let the sound rays SRsk and SRkr be examples. The sound along with the sound rays are emanated from the sound source S and incident to the sound receiving point R by being reflected once at the section k. The volume thereof denoted as $Pr_2$ is computed with the form factors $Fsc_1$ and $Fc_1r$, and absorption coefficient $\alpha k$ according to:

$$Pr_2 = Fsc_1 \times Fc_1 r \times (1-\alpha k) \times Ps$$

Subsequently, like with the direct sound, the distances between the sound source S and the section k, the section k to the sound receiving point R are added and divided by the speed of sound to compute the arrival time $T_2$.

The above calculation is applied to all of the sounds of the first order reflections.
(The Second Order Reflections)

Let the sound rays $SRsi_2$, SRij and SRjr be examples. The sound along with these sound rays are reflected at the sections i and j before it arrives at the sound receiving point R. The arrival volume denoted as $Pr_2$ is computed with the form factors Fsc, $Fcc_2$ and $Fc_2r$, and absorption coefficients $\alpha i$ and $\alpha k$ according to:

$$Pr_2 = Fsc \times Fcc_2 \times Fc_2 r \times (1-\alpha i) \times (1-\alpha k) \times Ps$$

Also, the distances between the sound source S and the section i, the sections i and the section j, and the section j to the sound receiving point R are added and divided by the speed of sound to compute the arrival time $T_3$.

The above calculation is applied to all of the sounds of the second order reflections.
(The Third Order Reflections)

The volume of the sound of all of the third order reflections is computed in the same manner described as above.
(The Higher Order Reflections)

Figure 6:
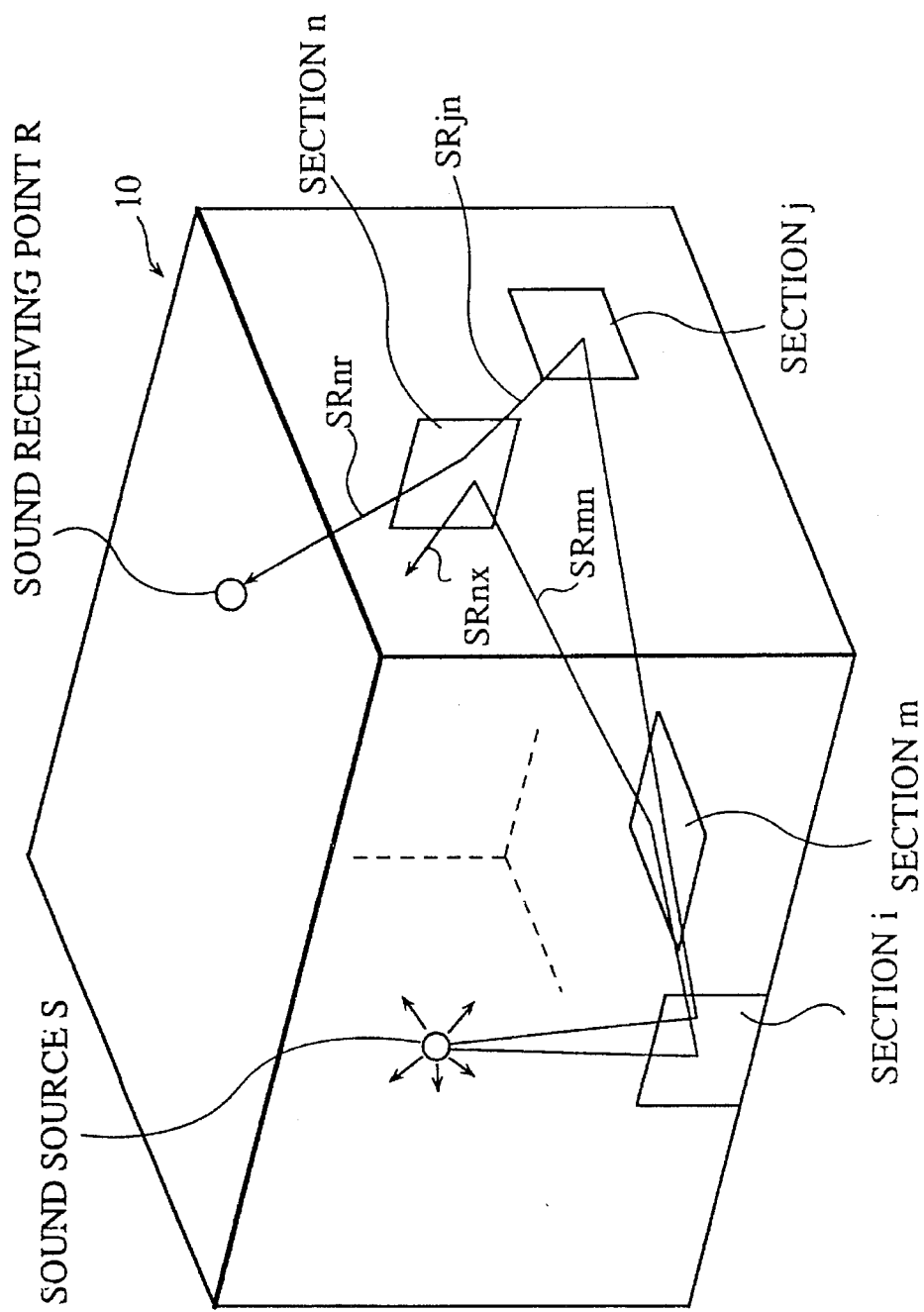
FIG. 6 is another illustration depicting the model space used by the echotime pattern computing unit 15.

Next, a method for computing the arrival volume of the sound of the higher order refections to the sound receiving point R will be explained with referring to FIG. 6.

Figure 7:
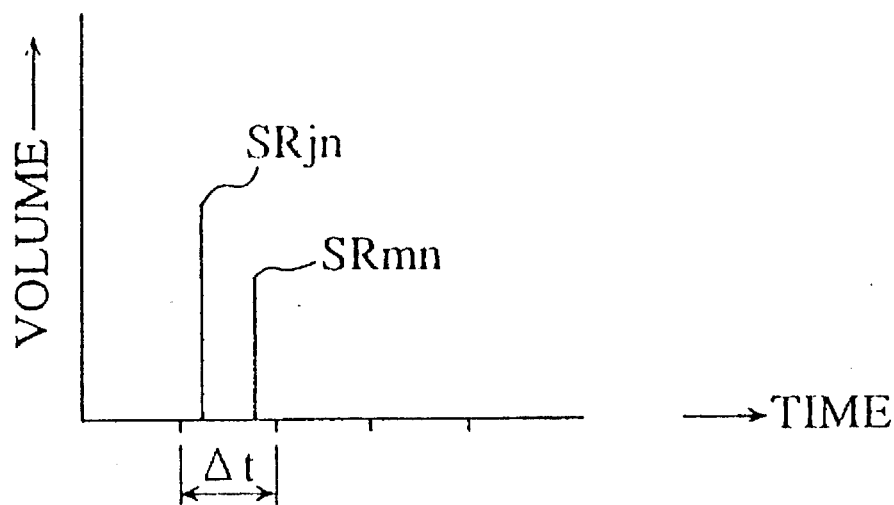
FIG. 7 (*a*) is a graph of the time series data of the actual arrival volume at one of the divided section.
Figure 7:
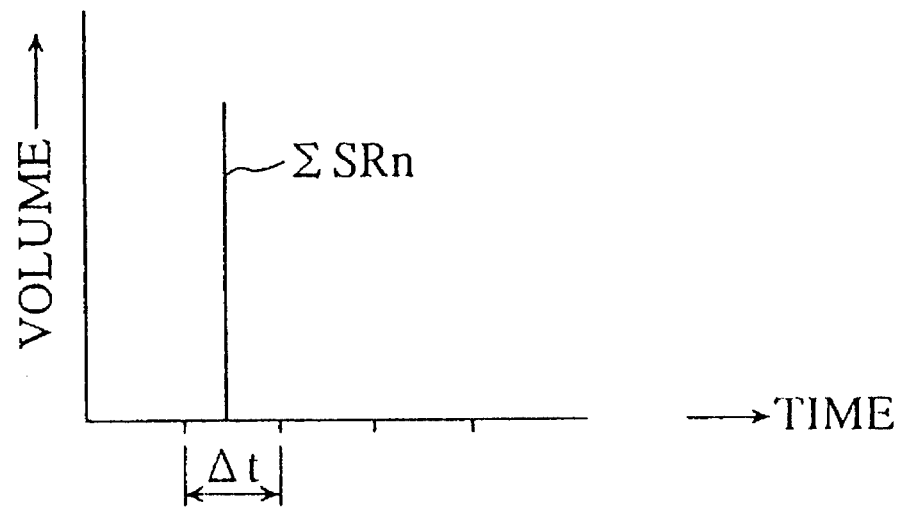

Let the section n be an example, then the time series data of the third order reflections, SRjn and SRmn as is shown in FIG. 7(a), have been computed at the end of the computation for the third order reflections.

These time series data are divided into a set of groups by a certain time interval $\Delta t$, for example, 0.1 Ms. The volume of each group is added to find a sum of the time series data within each group, and the resulting data, referred to as the time series data of the sum, is shown in FIG. 7(b). Then, the section having the time series data of the sum is positioned as a new virtual sound source S'. In practice, at the new sound source S', N sound rays arriving at the concerned section during $\Delta t$ are composited into a single sound ray, so that it will have a volume equal to the sum of the volume of the N sound rays'.

Back to the flowchart again, in Step 250, as is with the sound of the lower order reflections, the arrival volume along with the sound rays to either the sound receiving point R or another section are computed. This computation is repeated until the arrival volume of all the sections becomes 1/10000 of the entire emanated volume Ps or less.

During the above-described computation, the sound receiving point R receives a large amount of the direct and indirect sounds as is shown in the graph in FIG. 8(a). The arrival sound rays are divided into a set of groups as is with the higher order reflections, for example by a certain time interval, then the number thereof is counted, and the arrival volume of each sound ray are summed up if they are plural.

When the arrival volume of all the sections becomes lower than the predetermined level in Step 250, the further computation is not proceeded. Instead, such a petty arrival amount are summed up in each section, and these sums are further added to the time series data in Step 260.

As a result, the time series data of the arrival volume at the sound receiving point R, as is shown in FIG. 8(b), is computed.

Accordingly, the data transducing unit 17 computes a mean arrival volume in Step 270 to interpolate data to generate the echotime pattern from the time series data of the sum in the following step 280.

More precisely, the data transducing unit 17 computes a mean arrival volume data as is shown in FIG. 8(c) from the time series data of the sum. To compute the mean arrival volume data, the sum of the arrival volumes at the receiving point R within a certain group is divided by the number of the arrival sound rays. Assuming that a composite sound ray SRr consisting of N(=3) sound rays arrives to the sound receiving point R with a arrival volume Pm during the third group(0.2–0.3 Ms), then the mean volume data SRa is computed according to:

$$SRa = Pm/N$$

Subsequently, to interpolate data to the mean volume data SRa thus calculated, the data transducing unit 17 applies the mean volume data of each group to the intermediate point of the corresponding group. Then, as is shown in FIG. 8(c), the tops of each bar in the graph representing the mean volume data of the groups are linked, so that an approximate line will be formed. By using this approximate line, the data converting unit 17 interpolates as many new lines as the actual arrival N sound rays in the corresponding group. As a result of this data interpolation, the echotime pattern of an approximate line as is shown in FIG. 8(c) is formed. This interpolation is not limited to the approximation by a line; a curve may be used instead of a line, or an addition of a weight corresponding to the arrival time to each sound ray also will do.

The optimal effects are obtained when $\Delta t$ is set to a corresponding value to a sampling frequency of the audio equipments such as compact disc player; for example, the optimal $\Delta t$ for a sampling frequency of 44.1 KHz is 22.7 Ms.

The echotime pattern thus computed is stored into the memory 18, and read out for further processing at the sound field reproducing unit 2.

Figure 9:
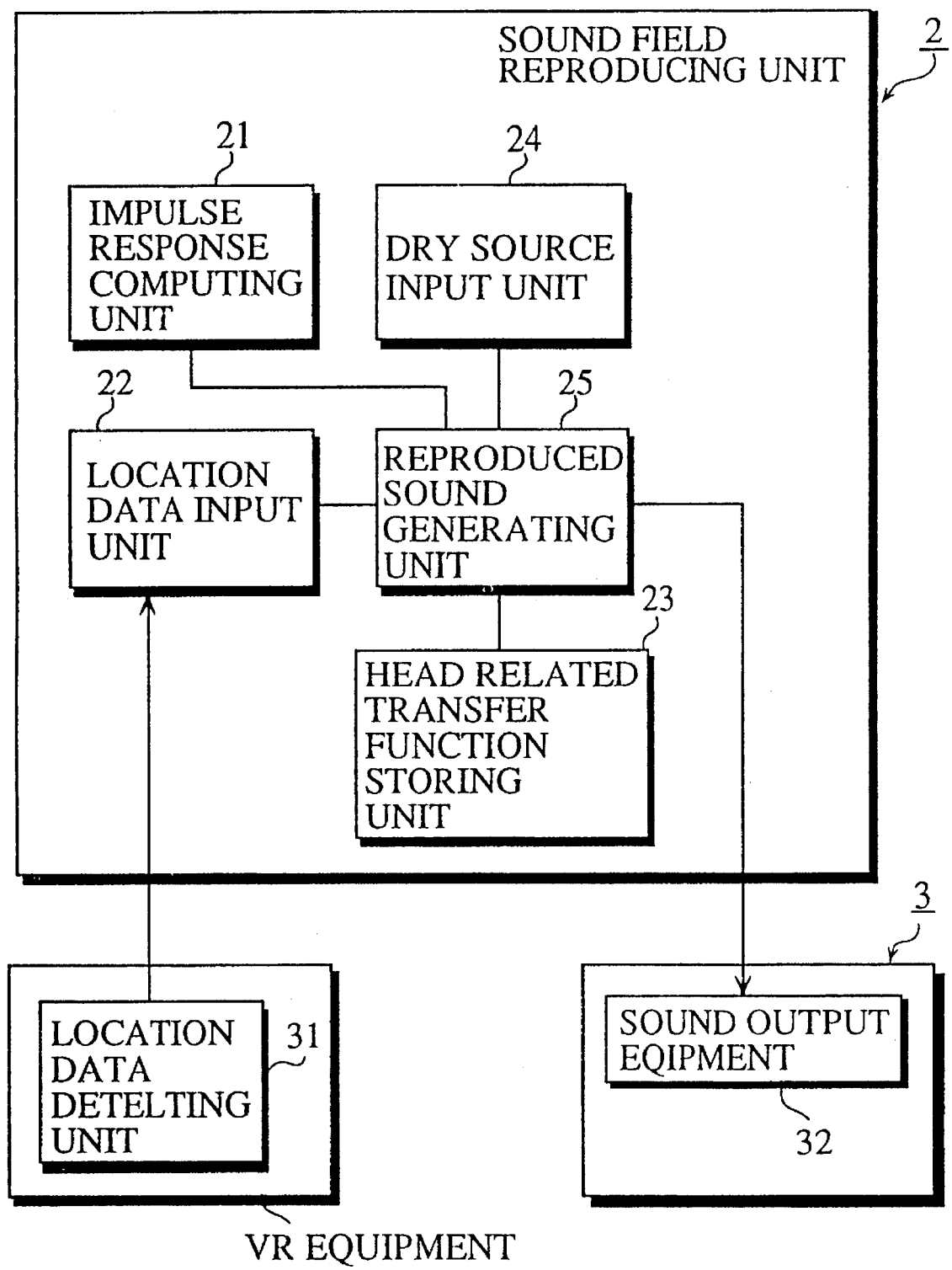
FIG. 9 is a block diagram detailing the construction of the sound field reproducing unit 2 and output unit 3.

FIG. 9 provides a detailed construction of these two components. The sound field reproducing unit 2 comprises an impulse response computing unit 21 for reading out the echotime pattern from the memory 18 to compute an impulse response, a location data input unit 22 for reading out the data of the location of the listener within the model space; the location data are detected by a location data detecting unit 31 such as the VR equipment in the output unit 3, a head transfer function storing unit 23 for storing a predetermined head transfer function, a dry source input unit 24 for inputting data related to a dry source of a sound(the sound recorded in an anechoic room) to be reproduced, a reproduced sound generating unit 25 for generating a consecutive sound signal by convoluting data related to the impulse response and head transfer function on the data related to the dry source with a plurality of digital signal processors(DSPs).

Figure 10:
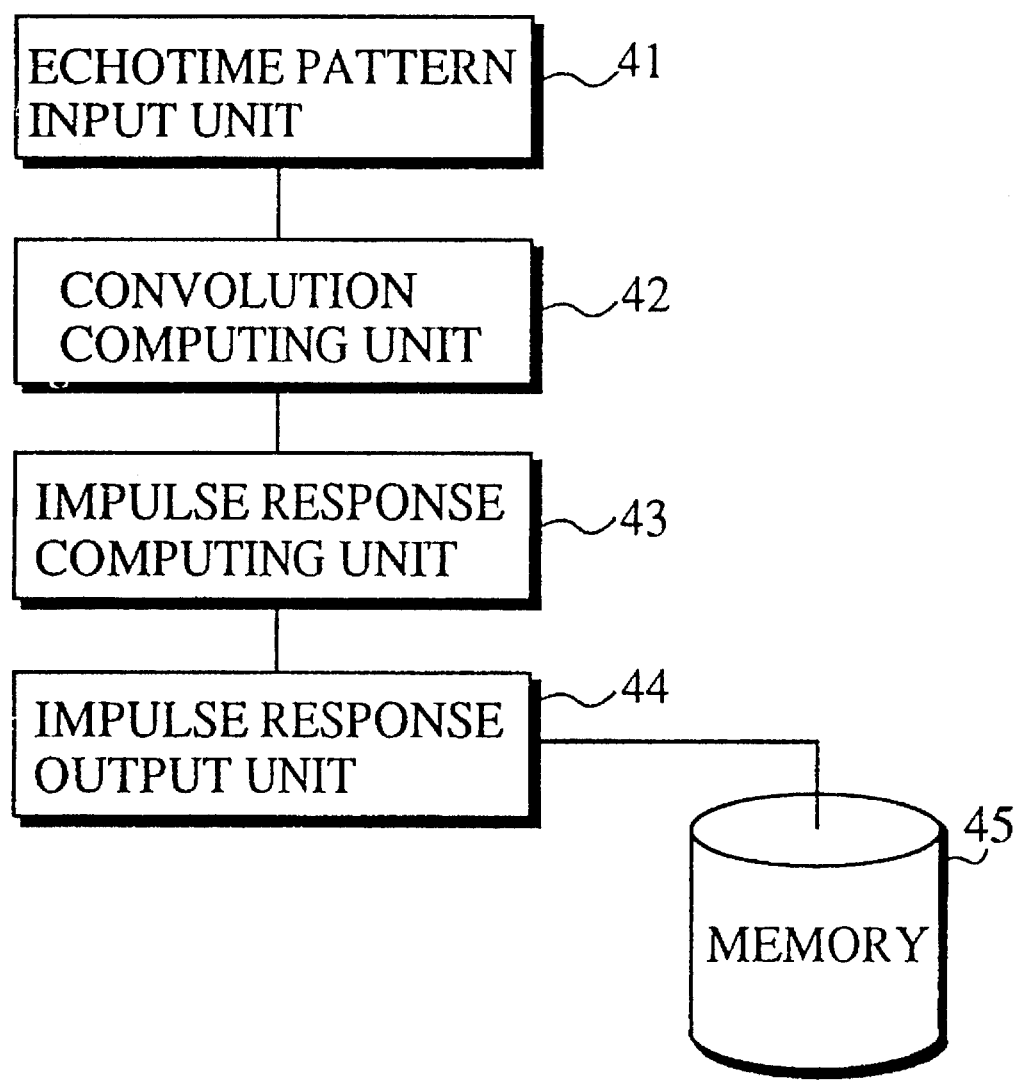
FIG. 10 is a block diagram detailing the construction of the impulse response computing unit 21.

As is shown in FIG. 10, the impulse response computing unit 21 includes a echotime pattern input unit 41 for inputting data related to the echotime pattern for each location in the model space, each incident direction, and each frequency band, a convolution computing unit 42 for convoluting the echotime pattern of each frequency band by a bandpass filter, an impulse response computing unit 43 for computing the impulse response by compositing responses from all the frequency bands, an impulse response output unit 44 for outputting the impulse response for each location and incident direction, and a memory 45 for storing data related to the impulse response.

The output unit 3 includes a sound output instrument 32 such as a headphone, over which a sound based on the consecutive signal from the reproduced sound generating unit 25 is reproduced, so that the listener can hear it.

In practice, a RB2(Reality Built for 2, a trade name) system or an Eyephone system of VPL Research Inc, and POLHEMUS are used for the location data detecting unit 31. In the Eyephone system, a sensor placed on top of the listener's head detects his location and his head's direction to output the related data to the sound field reproducing unit 2 on real time.

The above described sound field reproducing unit 2 and output unit 3 operate in the following way.

The impulse response computing unit 21 computes the impulse response for each location and incident direction (listener's head direction) from the echotime pattern.

Figure 11:
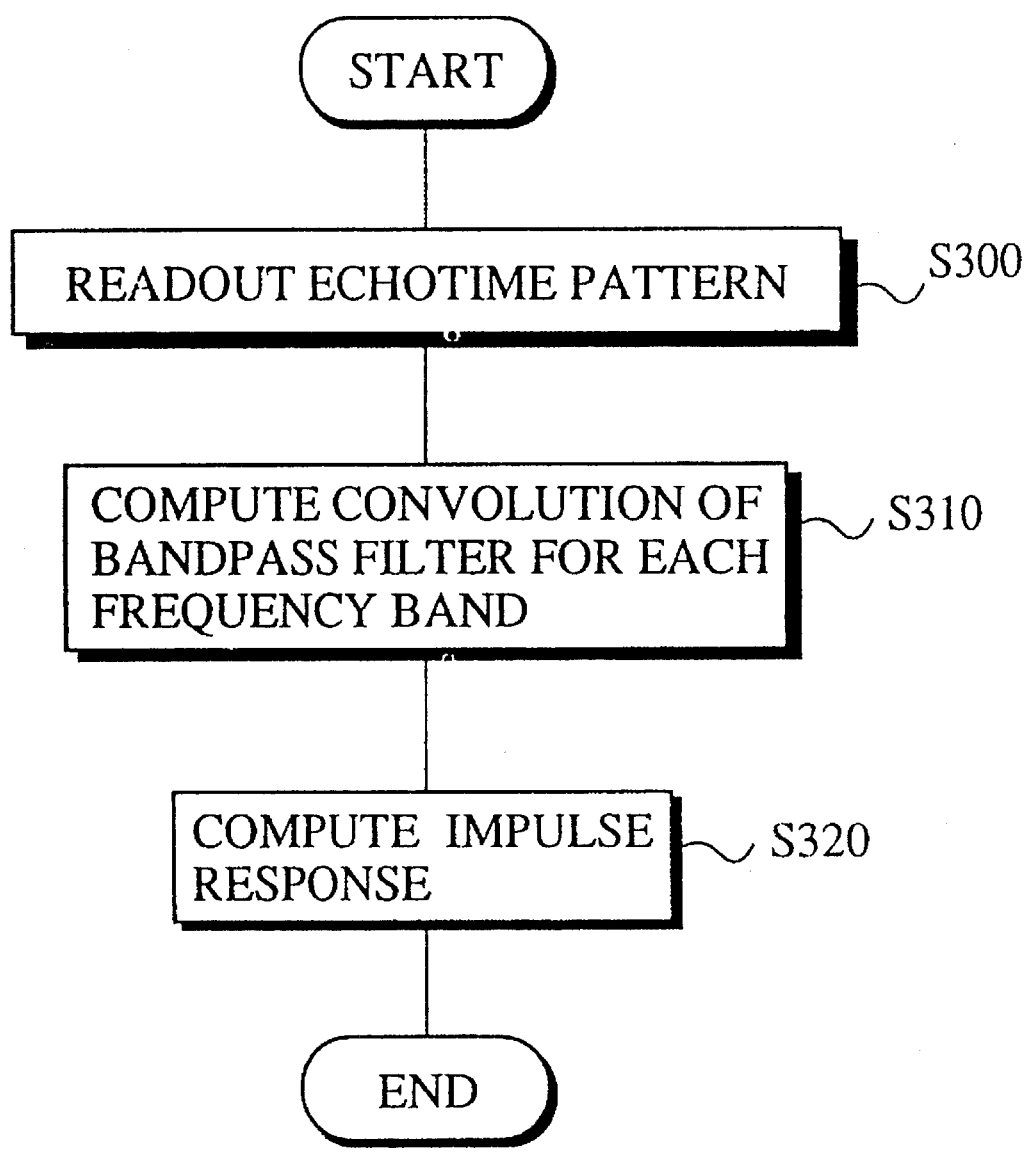
FIG. 11 is a flowchart detailing the operation of the impulse response computing unit 21.

The flowchart in FIG. 11 details how the impulse response is generated from the echotime pattern.

In Step 300, the impulse response computing unit 21 reads out the echotime pattern sequentially from the memory 18, and in Step 320, it computes a response for each frequency band by convoluting each frequency by a bandpass filter. Consequently, the impulse data related to all the locations in the model space and incident direction are computed and stored in the memory 45.

Figure 12:
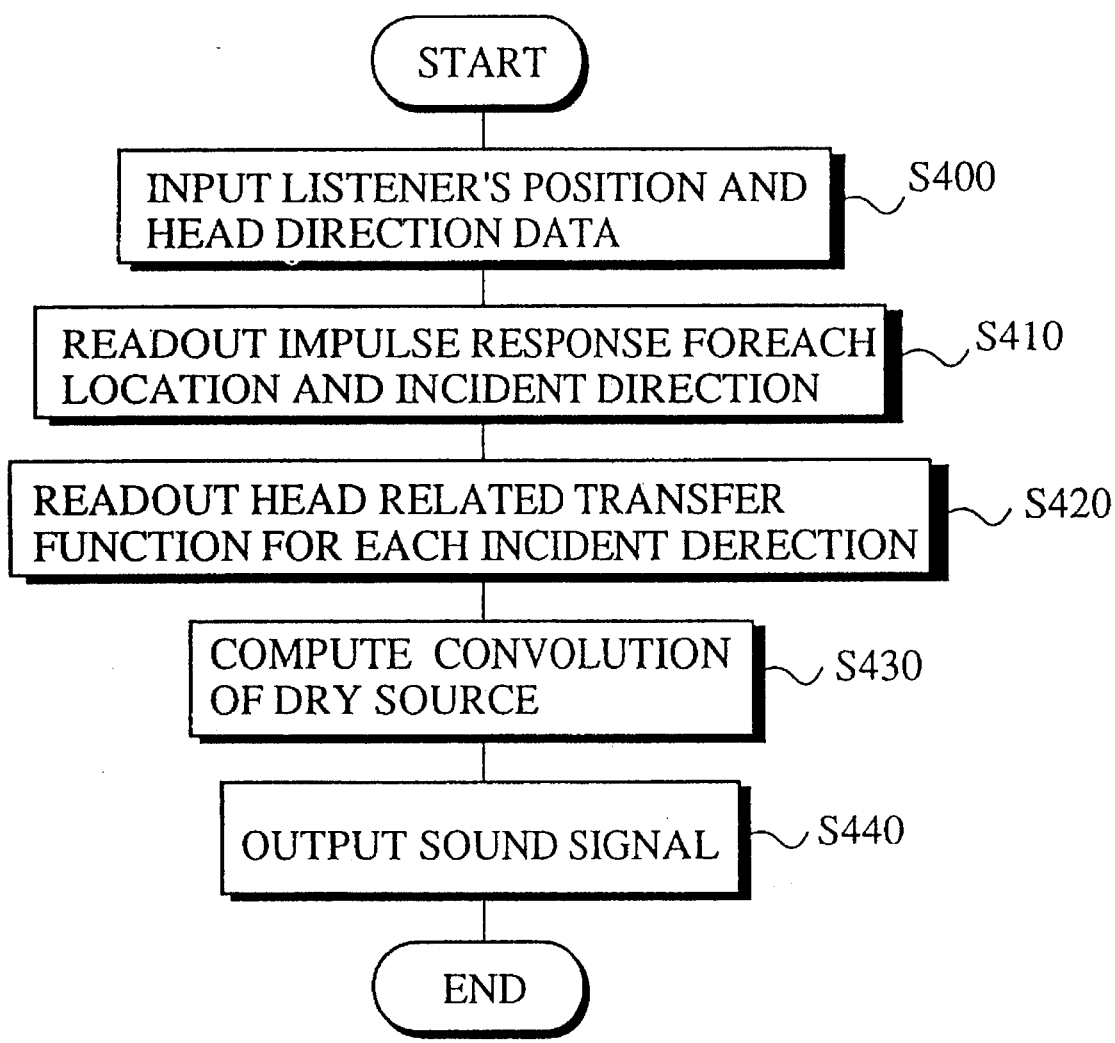
FIG. 12 is a flowchart detailing the operation of the sound field reproducing unit 2 in FIG. 9.

Once the impulse data are computed, the sound field reproducing unit 2 shifts to a sound reproducing process, which is detailed by the flowchart in FIG. 12.

In Step 400, the sound field reproducing unit 2 reads out the location data from the location data input unit 22 on real time. Then, the impulse response input unit 41 reads out the impulse response data corresponding to the location data from the memory 45 in Step 410. Further, it reads out the head transfer function data from the head transfer function storing unit 43 corresponding to the location data as to the listener's head direction in Step 420. As previously mentioned, the head transfer function is a parameter that represents the change in an incident sound in accordance with the shape of the listener's head and a location of his ears, and stored in the head transfer function storing unit 43 in advance.

Subsequently, in Step 430, the reproduced sound generating unit 25 receives the dry source of the sound from the dry source input unit 24, and convolutes the impulse response data on head transfer function data with the DSPs to generate a consecutive sound signal, which is outputted to the sound output unit 52 on real time and transduced into a sound in Step 440.

As a result, the listener can hear a realistic, stereophonic sound as if he were in the model space.

[Second Embodiment]

Figure 13:
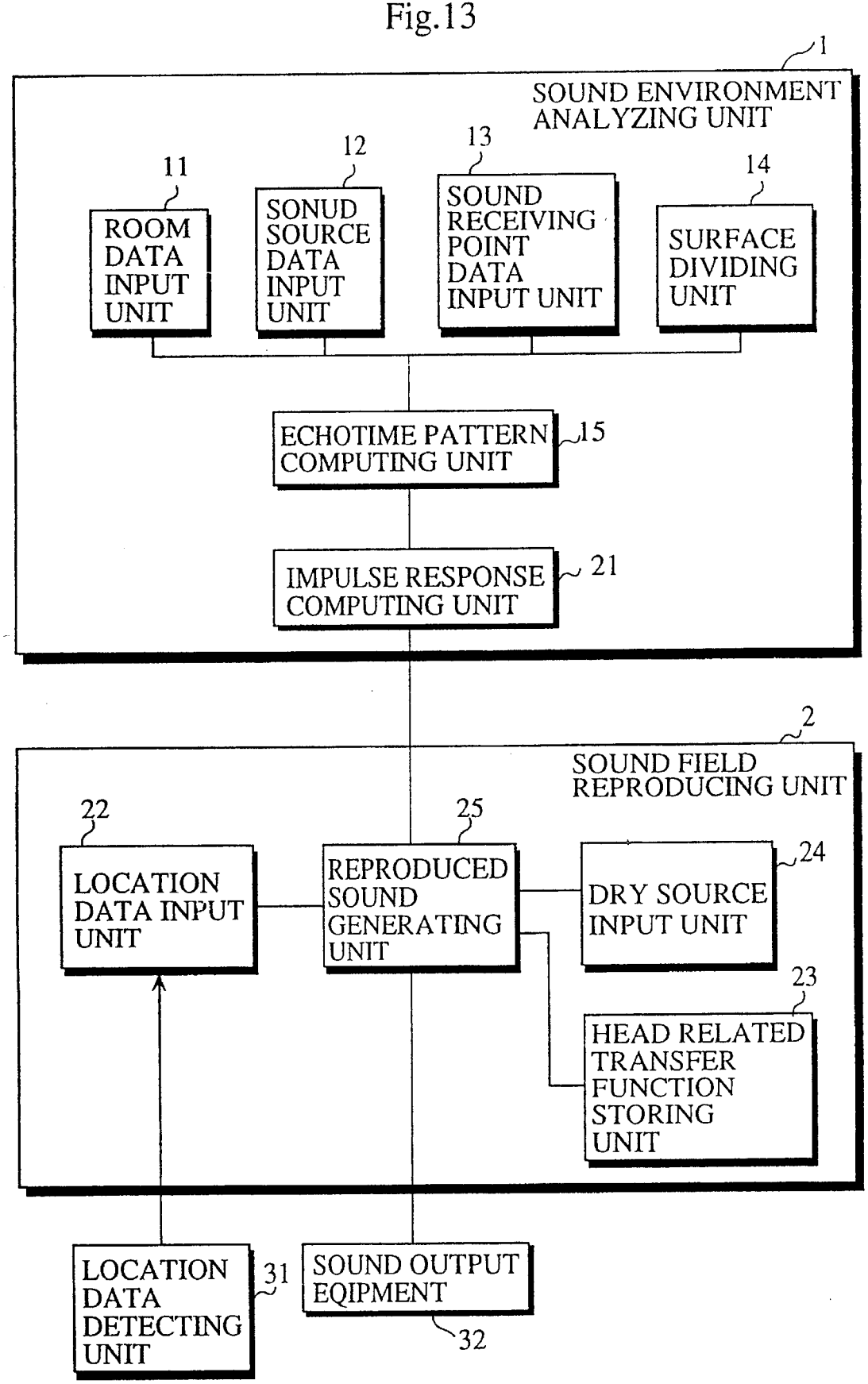
FIG. 13 is a block diagram of the sound environment simulator in accordance with the second embodiment.

The sound environment simulator in accordance with the second embodiment is detailed in FIG. 13. The essential construction thereof is identical with the simulator of the first embodiment except that the sound environment analyzing unit 1 includes the echotime pattern computing unit 15 and impulse response computing unit 21; that the impulse response data for every location are computed with a computing server and stored into a memory in advance; and that the sound field reproducing unit 2 reads out the impulse response data and a head transfer function corresponding the location data from the memory to reproduce the stereophonic data from the dry source on real time. Otherwise, like components are labeled with like reference numerals with respect to the first embodiment, and the description of these component is not repeated.

[Third Embodiment]

Figure 14:
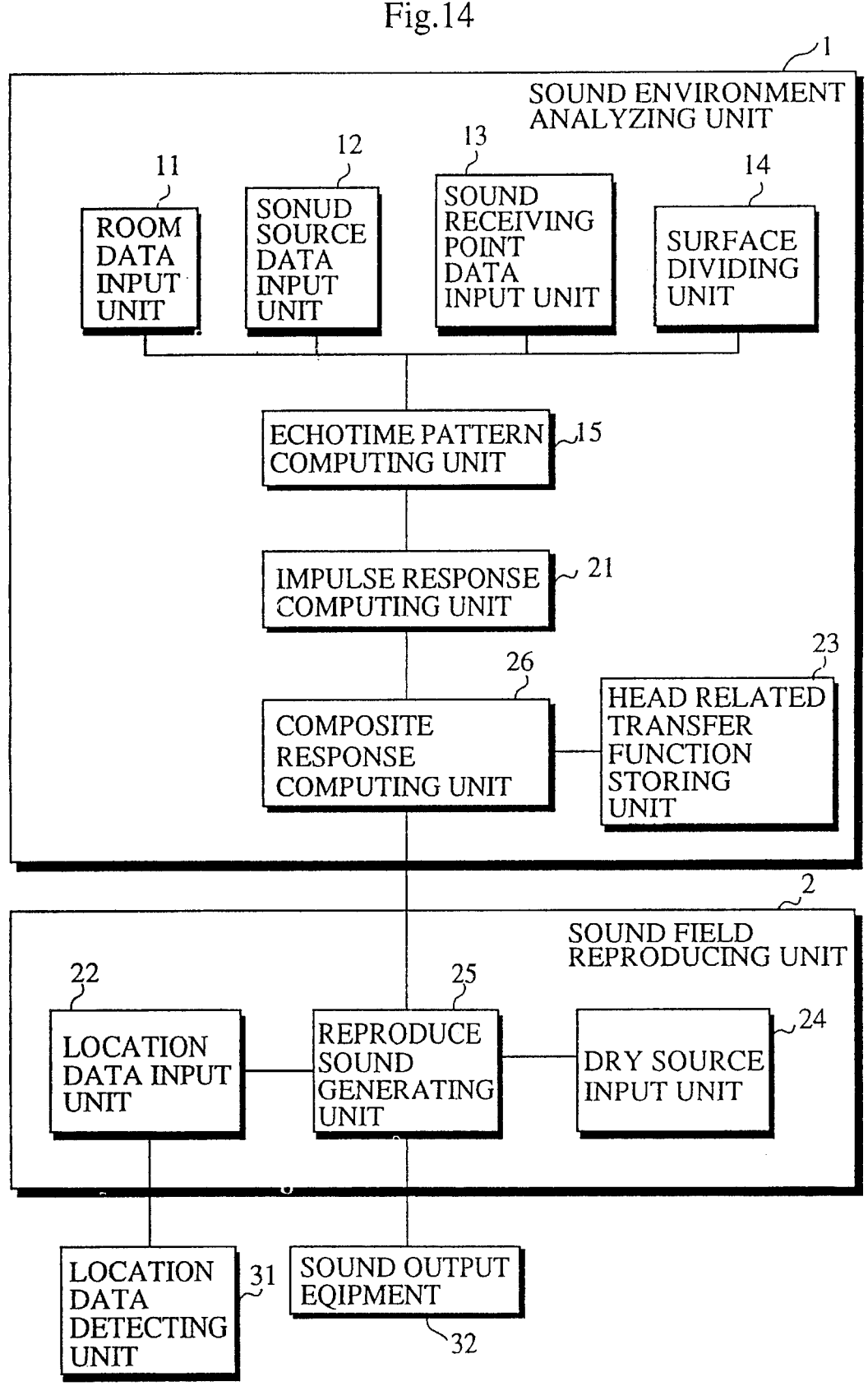
FIG. 14 is a block diagram of the sound environment simulator in accordance with the third embodiment.

The sound environment simulator in accordance with the third embodiment is detailed in FIG. 14. The essential construction thereof is identical with the simulator of the first embodiment except that the sound environment analyzing unit 1 includes the head transfer storing unit 23 and a composite response data computing unit 26. The composite response data computing unit 26 convolutes the head transfer function data and impulse response data to compute the composite response data in advance, and accordingly, the sound reproducing unit 24 convolutes the composite response data for each head direction into the dry source on real time with the DSPs. Otherwise, like components are labeled with like reference numerals with respect to the first embodiment, and the description of these component is not repeated.

With the simulator constructed as above, the number of the DSPs can be decreased as the number of incident directions increases. At the same time, the less the data amount to be transferred to the DSPs becomes, the faster the sound environment simulator can correspond to the dynamic changes of the listener.

As has been explained, computing the time series data of the arrival volume enables a precise prediction of the reverberant time. It also allows an accurate computation of the frequency characteristics of a reverberant sound. Thus, one or a few DPSs can also serve as a delaying circuit when the time length of the reverberant sound and the frequency characteristics are analyzed and approximated. As a result, the realistic sound field can be reproduced by using less DSPs without impairing the listener's feeling of his presence in the model space.

The reflected sounds are divided into the lower order reflections and higher order reflections and analyzed by the respective computation methods to enhance the work efficiency of the memory. However, the algorithm used for the higher order reflections can be used on all of the reflected sounds.

In all the three embodiments, the sound environment simulator is designed to simulate the sound environment which adequately corresponds to the changes occurring when the listener sits, stands up, walks around or moves his head. However, it may be designed to apply to a specific situation alone.

If the sound environment simulator is to be applied to a case where the listener does not change his position, the sound receiving point R can be fixed to a single point, which obviates the location data detecting unit 31 and location data input unit 22, contributing to simplifying the construction.

If the sound environment simulator is to be applied to a case when the listener moves his head in the same position, the sound receiving point R can be fixed to a single point as well, and the location data detecting unit 31 is only to detect the directional change of the listener's head. Hence the amount of data used for computation decreases, which results in enhancing the overall operation speed.

If the sound environment simulator is to apply to a case when the listener changes his position as he walks around, the height from the floor level to the listener's ears have a constant value. Therefore, the three dimensional location data can be replaced with two dimensional data. Hence, the overall operation speed can be enhanced for the same reason described in the previous paragraph.

With the sound environment simulator of the present invention, there may be a plurality of virtual sound sources, and even when they change their locations, the realistic, stereophonic sound can be reproduced as well; for it reproduces an adequate sound field by adding the impulse response data for each incident direction accordingly.

The confined space was created as the virtual space in all the embodiments; however, it can be an open space if equations for the open space are used to compute the echotime patterns. Also, the present invention enables the computation of the arrival volume of the sound of the higher order reflections as has been described. Further, it can transduce the echotime pattern into the impulse response data in accordance with the listener's arbitrary position and head direction. Consequently, the present invention reproduces the realistic sound field by means of the existing VR equipment, which improves efficiency in designing for an audio and living room.

Although the present invention has been fully described by way of example with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A sound environment simulator comprising:
   means for determining the position of the listener's head;
   echotime pattern computing means for computing an echotime pattern of a space to be analyzed by a geometric method based on the theory of acoustics with input data as to the conditions of said space;
   impulse response computing means for computing an impulse response by computing a response for a plurality of predetermined frequency bands from said echotime pattern and compositing all of said responses together;
   sound field reproducing means for generating reproduced sound data by convolution of said impulse response on non-reverberant sound source data, taking into consideration the position of the listener's head; and
   output means for outputting a sound by transducing said reproduced sound data.

2. The simulator of claim 1, wherein said echotime pattern means includes:
   analysis data setting means for setting analysis data by receiving analysis condition data including a shape and physical data of walls of said space, dividing said walls into a set of certain sections, and setting a virtual sound source and a virtual sound receiving point at respective arbitrary positions within said space;
   time series data computing means for computing time series data related to arrival volume of a sound emanated from said virtual sound source to said virtual sound receiving point; and
   data transducing means for transducing said time series data related to the arrival volume into the echotime pattern by certain data interpolation.

3. The sound environment simulator of claim 1, wherein said sound field reproducing means includes:
   dry source input means for inputting the non-reverberant sound source data;
   head transfer function storing means for storing data related to a head transfer function
   location data detecting means for detecting data related to at least one of a listener's head location and a listener's head direction; and
   reproduced sound data generating means for generating data related to a reproduced sound by extracting and convoluting said impulse response and said head transfer function corresponding to said detected location data on said non-reverberant sound source data.

4. A sound environment simulator comprising:
   echotime pattern computing means for computing an echotime pattern of a space to be analyzed by a geometric method based on the theory of acoustics with input data as to the conditions of said space, including analysis data setting means for setting analysis data by receiving analysis condition data including a shape and physical data of walls of said space, dividing said walls into a set of certain sections, and setting a virtual sound source and a virtual sound receiving point at respective arbitrary positions within said space;
   time series data computing means for computing time series data related to arrival volume of a sound emanated from said virtual sound source to said virtual sound receiving point;
   data transducing means for transducing said time series data related to the arrival volume into the echotime pattern by a certain data interpolation;
   impulse response computing means for computing an impulse response by computing a response for each frequency band from said echotime pattern and compositing all of said responses together;
   sound field reproducing means for generating reproduced sound data by convolution of said impulse response on non-reverberant sound source data; and
   output means for outputting a sound by transducing said reproduced sound data.

5. The simulator of claim 4, wherein said sound field reproducing means includes:
   dry source input means for inputting the non-reverberant sound source data;
   head transfer function storing means for storing data related to a head transfer function;
   reproduced sound generating means for generating data related to a reproduced sound by convoluting said impulse response from said impulse response computing means and said head transfer function from said head transfer function storing means on said non-reverberant sound source data from said dry source input means.

6. The simulator of claim 5, wherein said sound field reproducing means further includes:
   location data detecting means for detecting data related to at least one of a listener's head location and a listener's head direction;
   wherein said reproduced sound generating means extracts said impulse response and said head transfer function corresponding to said detected location data to convolute them on said non-reverberant sound source data.

7. The simulator of claim 6, wherein said location data detecting means detects time varying data.

8. The simulator of claim 6, wherein said output means comprises a headphone.

9. The simulator of claim 4, wherein said time series data computing means computes form factors to compute the arrival volume of the sound to the sound receiving point by using said form factors and a sound absorption coefficient of each section included in said physical data of the walls.

10. A sound environment simulator comprising:

analysis data setting means for setting analysis data by receiving analysis condition data including a shape and physical data of walls of said space, dividing said walls into a set of certain sections, and setting a virtual sound source and a virtual sound receiving point at an arbitrary position within said space;

echotime pattern computing means for computing an echotime pattern at a receiving point of a sound emanated from a sound source placed arbitrarily in a space to be analyzed;

varying means for varying the relative position of the virtual sound receiving point and the virtual sound source in the space to be analyzed; and output means for outputting a sound based on the echotime pattern.

11. The sound environment simulator of claim 10, wherein time series data computing means for computing time series data related to arrival volume of a sound emanated from said virtual sound source to said virtual sound receiving point; and data transducing means for transducing said time series data related to the arrival volume into an echotime pattern by certain data interpolation.

12. A sound environment simulator comprising:

analysis data setting means for setting analysis data by receiving analysis condition data including a shape and physical data of walls of said space, dividing said walls into a set of certain sections, and setting a virtual sound source and a virtual sound receiving point at an arbitrary position within said space;

echotime pattern computing means for computing an echotime pattern at a receiving point of a sound emanated from a sound source placed arbitrarily in a space to be analyzed, including time series data computing means for computing time series data related to arrival volume of a sound emanated from said virtual sound source to said virtual sound receiving point; and data transducing means for transducing said time series data related to the arrival volume into an echotime pattern by certain data interpolation.

13. The sound environment simulator of claim 12, further comprising:

impulse response computing means for computing an impulse response by computing a response for each frequency band from said echotime pattern by compositing all of said responses.

14. The sound environment simulator of claim 13, further comprising:

composite response generating means for computing a composite response for each direction of a listener's head by convolution of said impulse response and said head transfer function.

15. A sound environment simulator comprising:

sound field reproducing means for generating reproduced sound data by convolution of non-reverberant sound source data and impulse response data, including dry source input means for inputting the non-reverberant sound source data;

head transfer function storing means for storing data related to a head transfer function;

location data detecting means for detecting data related to at least one of a listener's head location and a listener's head direction;

reproduced data generating means for generating data related to a reproduced sound by extracting and convoluting said impulse response and said head transfer function corresponding to said detected location data on said non-reverberant sound source data; and output means for outputting a sound by transducing said reproduced sound data.

16. An apparatus for analyzing a sound space comprising:

means for setting analysis conditions, including a memory for storing data of a shape of a space to be analyzed and physical data of walls thereof, a set of predetermined sections by dividing the physical data of the walls, a virtual sound source and a virtual sound receiving point;

means for computing time series data related to arrival volume of a sound emanated from said virtual sound source to said virtual sound receiving point for each incident direction and for predetermined frequency bands; and means for computing an echotime pattern by data interpolation to said time series data and providing a corresponding signal.

17. The apparatus of claim 16, wherein the means for computing time series data includes:

means for computing data related to the arrival volume of the sound emanated directly from said sound source to said sound receiving point;

means for computing data related to the arrival volume of the sound arriving at said sound receiving point and another section by reflecting for up to a predetermined number of times by using a sound absorption coefficient of each section included in said physical data of the walls and form factors;

means for computing data related to the arrival volume of a sound arriving at said sound receiving point by reflecting for more than a predetermined number of times by using the sound absorption coefficient of each section included in said physical data of the walls and form factors; and means for computing time series data by dividing said arrival volume data into a set of groups by a certain time interval.

18. The apparatus of claim 17, wherein the means of computing data related to the arrival volume of a sound arriving at said sound receiving point by reflecting for more than a predetermined number to times, a new virtual sound source is set by integrating said arrival volume data of each group, and the arrival volume of sounds emanated from said new virtual sound source to any of the sections are repeatedly computed.

19. A sound environment simulator comprising:

means for setting analysis conditions, including a memory for storing data of a shape of a space to be analyzed and physical data of walls thereof, a set of predetermined sections by dividing the physical data of the walls, a virtual sound source and a virtual sound receiving point;

means for computing time series data related to arrival volume of a sound emanated from said virtual sound source to said virtual sound receiving point for each incident direction and for predetermined frequency bands;

means for computing an echotime pattern by data interpolation to said time series data and providing a corresponding signal; and means for outputting a sound based on the time series data and echo time pattern corresponding signal.

* * * * *